United States Patent [19]

Schramm

[11] 4,403,918
[45] Sep. 13, 1983

[54] HUBLESS, HINGELESS AND BEARINGLESS HELICOPTER ROTOR SYSTEM

[76] Inventor: Buford J. Schramm, 1330 E. Fremont Dr., Tempe, Ariz. 85204

[21] Appl. No.: 340,774

[22] Filed: Jan. 19, 1982

[51] Int. Cl.³ .............................................. B64C 27/38
[52] U.S. Cl. .................................... 416/138; 416/141; 416/226
[58] Field of Search .................. 416/226, 141, 134 A, 416/138 A, 230 A

[56] References Cited

U.S. PATENT DOCUMENTS

| 2,757,745 | 8/1956 | Verhage et al. ................ 416/138 A |
| 4,111,605 | 9/1978 | Roman et al. ............. 416/138 A X |
| 4,227,857 | 10/1980 | Reyes ......................... 416/230 A X |
| 4,292,009 | 9/1981 | Weiland et al. ............... 416/134 A |

Primary Examiner—Harvey C. Hornsby
Assistant Examiner—Christine A. Peterson
Attorney, Agent, or Firm—Donald D. Mon

[57] ABSTRACT

A helicopter rotor system with a plurality of identical rotor blades each of which includes a skin that forms an interior region, a counterweight rod and a bundle of longitudinally-extending fibers in the region. The bundle continues outside of the region, and there it includes a bight portion with a pair of arms and a bend. The fibers in the region are continuations of the fibers in the bight portion. A torque tube is attached to the counterweight rod, and a bearing stabilizes the torque tube relative to the mast, but does not transfer any appreciable centrifugal load. This bearing permits rotation (feathering) of the torque tube around its own axis, and lateral movement in any direction from the torque tube axis, around the center of this bearing (lead lag, and flapping). The bight portion is progressively shaped from a single flat portion bent directly around the mast, through a pair of separate channel sections to a bundle adjacent to the counterbalance rod. The fibers are bonded together, and in the said region they are bonded not only to each other, but also to the counterweight rod, and to the skin. The blades are angularly spaced apart, and their flat portions are stacked one on top of the other. Attachment means, preferably fasteners and mounting plates, attaches the stack of flat portions to the mast, where they transfer the centrifugal load to the mast and are driven directly by it.

10 Claims, 9 Drawing Figures

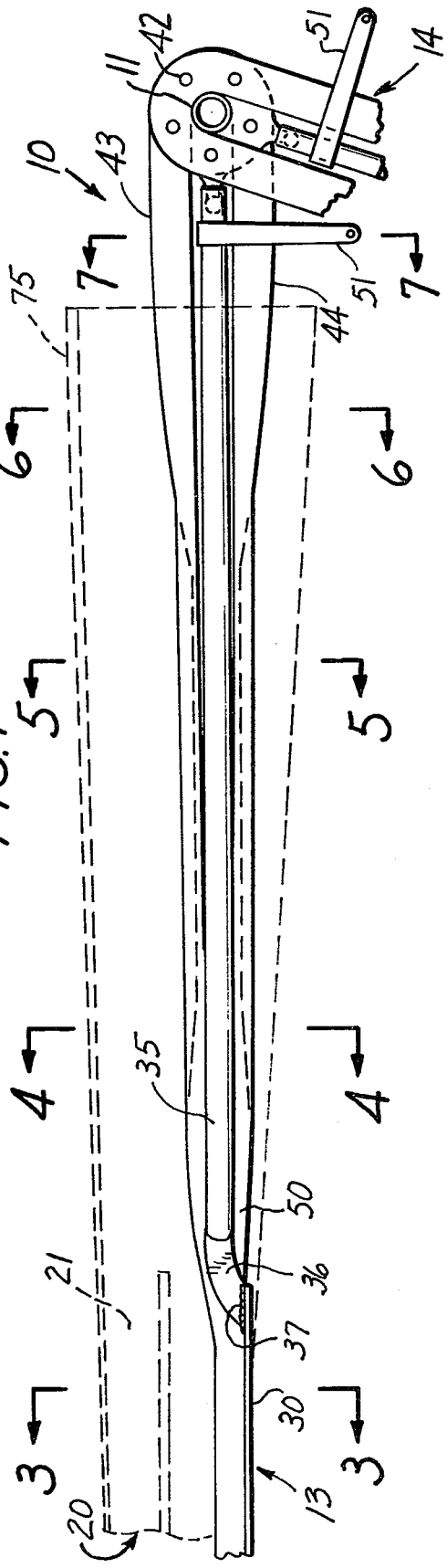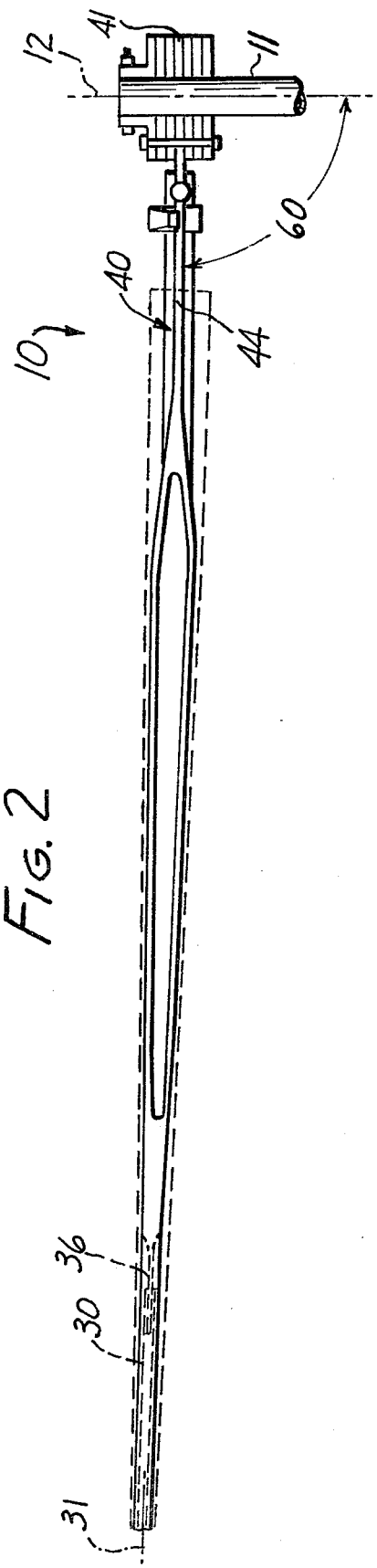

HUBLESS, HINGELESS AND BEARINGLESS HELICOPTER ROTOR SYSTEM

CROSS REFERENCE TO OTHER PATENT APPLICATION

This is a continuation in part of applicant's co-pending U.S. patent application, Ser. No. 26,653, filed April 23, 1979, entitled "Helicopter Rotor Blade and Method for Making the Same", now U.S. Pat. No. 4,316,700, issued Feb. 23, 1982, entitled "Unitary, Bonded-Together Helicopter Rotor Blade."

FIELD OF THE INVENTION

This invention relates to a helicopter rotor system, in particular a rotor system which is hubless, hingeless and bearingless.

BACKGROUND OF THE INVENTION

Helicopter rotor systems constitute a highly developed art. Especially for the larger rotor systems, and also for the smaller, lighter rotor systems, the mounting of the blades for their necessary motions is relatively complicated. Attempts are being made to provide hingeless, hubless and bearingless rotor systems, but these are presently quite complicated and extremely critical in their construction. It is an object of this invention to provide a hubless, hingeless and bearingless rotor system for a light helicopter which can readily be manufactured with the use of conventional fiberglass fabrication techniques and simple, strong and expedient metal components without many of the intermediate elements between the blade and the mast which are common in existing rotor systems.

BRIEF DESCRIPTION OF THE INVENTION

A helicopter rotor system according to this invention includes a rotary mast having an upright axis and a plurality of rotor blades mounted to the rotary mast to be turned directly by the mast. Each blade has a respective longitudinal axis directed away from the mast, the rotor blades all being identical to one another. Each blade comprises a skin that forms an airfoil and an internal region. A counterweight rod and a spar extend longitudinally inside this region. The spar comprises a bundle of aligned fibers which, inside the region, are bonded to each other, to the skin, and to the counterweight rod. The bundle is doubled so as to form a U-shaped bight construction with a bend and a pair of arms exposed outside of the skin. The fibers inside the region constitute continuations of the fibers in the arms and are defined as part of the respective blade. A longitudinally-extending torque tube is rigidly attached to the counterweight rod at a first end of the torque tube, and a first bearing member is provided adjacent to the other end of the torque tube. This bearing member does not react to centrifugal loads, and is bearingless in that sense. It does provide for feathering and flapping movements. The torque tube has an axis. A second bearing member is mounted to the mast and is engaged to the first bearing member, whereby the torque tube is rotatable around its own axis and can move in any angular direction away from its axis around the center of the second bearing means. It can also shift axially when centrifugal loads are applied. This bearing is not intended to transfer any appreciable centrifugal load from the blade to the mast. Instead, its function is to stablize the torque tube so it can rotate around its own axis for feathering motion, and angularly in any direction from the torque tube axis, around the center of the first bearing member for lead/lag and flapping motion. The bight portion is progressively shaped from a flat portion bent directly around the mast, through a pair of separate channel sections to a bundle adjacent to the counterweight rod. Pitch horn means is attached to the torque tube to rotate the torque tube around the axis of the torque tube, and attachment means attaches the stacked flat portions to the mast for transfer of the centrifugal load to the mast.

According to a preferred but optional feature of the invention, the attachment means comprises a pair of end plates holding the flat portions in a stack, one of the end plates being a flange fixed to the mast, whereby the blades and the mast become a unitary system.

The above and other features of the invention will be fully understood from the following detailed description and the accompanying drawings, in which:

BRIEF DESCRIPTION OF THE DRAWINGS

FIG. 1 is a partial top view of the presently-preferred embodiment of the invention;

FIG. 2 is a side view partly in cutaway cross-section, of the system shown in FIG. 1;

DETAILED DESCRIPTION OF THE INVENTION

Figure 7:
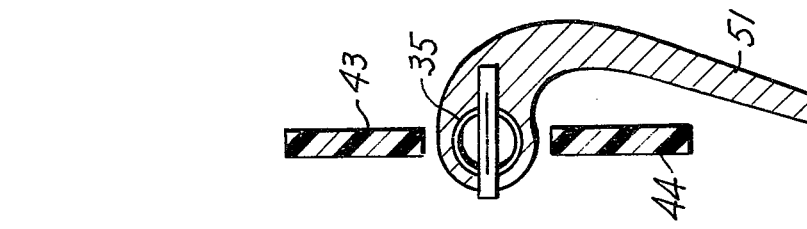
FIGS. 3, 4, 5, 6 and 7 are cross-sections taken at lines 3—3, 4—4, 5—5, 6—6 and 7—7, respectively, in FIG. 1.
Figure 6:
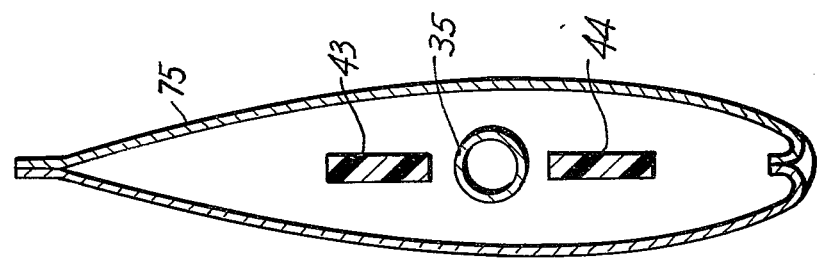

The presently preferred embodiment of a helicopter rotor system 10 according to this invention is shown in the Figs. It includes a mast 11 mounted to a fuselage and driven by a fuselage-mounted engine (both not shown). The mast has an upright axis of rotation 12 around which it turns to drive a plurality of rotor blades of which two are shown, blades 13 and 14. In the example shown, five identical and identically mounted blades will be mounted, spaced equally angularly apart from one another around axis 12. Because all of them are identical, only blade 13 will be described and shown in detail.

Especially in FIGS. 1 and 2, the size of the parts near the mast are shown disproportionately large, the blade itself having been reduced in size to fit it on the "sheet".

The airfoil portion 20 of blade 13 is foreshortened in the drawings. It will be made of any appropriate length and dimensions, extending as far to the left as desired, generally shaped to NACA profiles, and is driven by the mast to exert a lifting force on the craft. The airfoil portion and its method of manufacture are shown in detail in applicant's presently co-pending U.S. patent application Ser. No. 026,653, filed Apr. 3, 1979, "Helicopter Rotor Blade and Method for Making the Same", now U.S. Pat. No. 4,316,700, issued Feb. 23, 1982, all of which is incorporated herein by reference and made a part hereof. The airfoil portion includes a skin 21 which is preferably made of a composite material, and shaped to an appropriate configuration. The skin may be made in two parts 22, 23 which can be mirror images of one another when the blade is symmetrical, or can be of different shapes when the blade is asymmetrical. The parts meet at the leading edge 24 and trailing edge 25. Bonding and joinder in this blade can readily be accomplished with adhesives. The trailing edges could be joined together by adhesives of fasteners.

The skin forms an internal region 26 which contains a longitudinally-extending spacer 27 that is U-shaped so that its flanges 28, 29 abut and are fastened to the parts 22, 23 respectively. Inside the region at the leading edge there is a metal counterweight rod 30 which extends parallel to the longitudinal axis 31 of the blade. A spar 32 is formed inside the region. It comprises a plurality of fibers joined together in a bundle by a bonding material to be described, and the skin, the fibers and the counterweight member are all mutually bonded to one another to form a monolithic construction adjacent to the leading edge. The spar is made of bundles of lengths of fibers as will be further described below.

The skin, spar, spacer and counterweight rod are assembled in accordance with the techniques described in more detail in the said co-pending patent application. Persons skilled in the art will recognize that the bundles of fibers can be appropriately formed while the bonding material is still liquid. Instead of building up the airfoil by bonding together a group of prefabricated parts, the skin itself could be used as a mold, and the counterweight rod, fibers and bonding material laid inside the skin, and the skin then closed and held in a fixture so it will have the proper contour during the curing operation. Also, the system can use the well-known "pre-preg" process for building up the structure.

At the inboard end of the counterweight member there is attached a torque tube 35 (FIG. 1). This torque tube is a strong metal tube which has a flattened portion 36 that is attached to the counterweight rod by a weldment 37 so that the torque tube can rotate (feather) the airfoil portion around its pitching axis. The fibers which form the spar continue inboard from the airfoil portion to form a bight portion 40. When the airfoil construction is made, the bight portion will be made at the same time, and the spar constitutes an extension of the bight portion itself. The purpose of the bight portion is to mount the airfoil portion directly to the mast so as to transfer the centrifugal load directly to the mast, without the interposition of bearings and clevises as are customarily used in the prior art.

The bight portion includes a flat portion 41 bent around the mast and fitted closely thereto. When this portion is manufactured, tooling pins (not shown) will be inserted so that the fibers do not cut across holes 42 through which bolts will later pass. In the example, because there are five blades there are five such holes.

Figure 5:
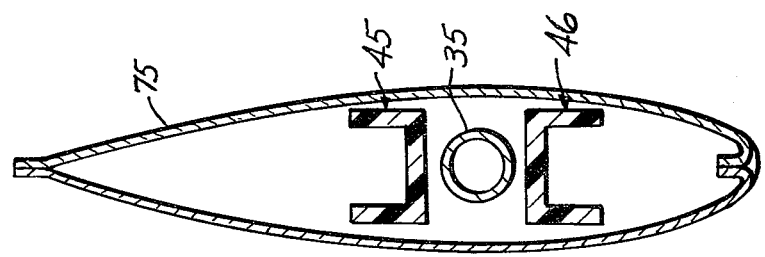
Figure 4:
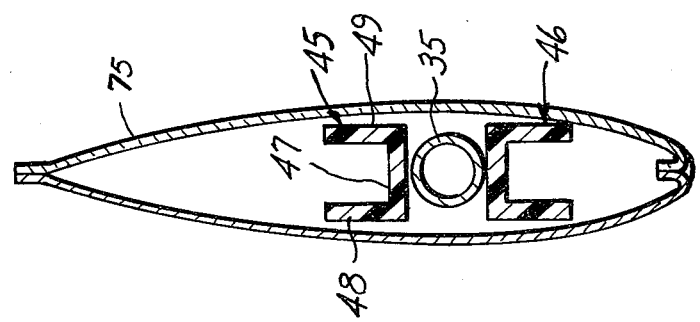
Figure 3:
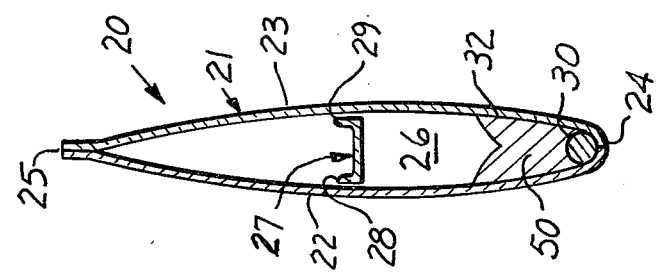
Figure 8:
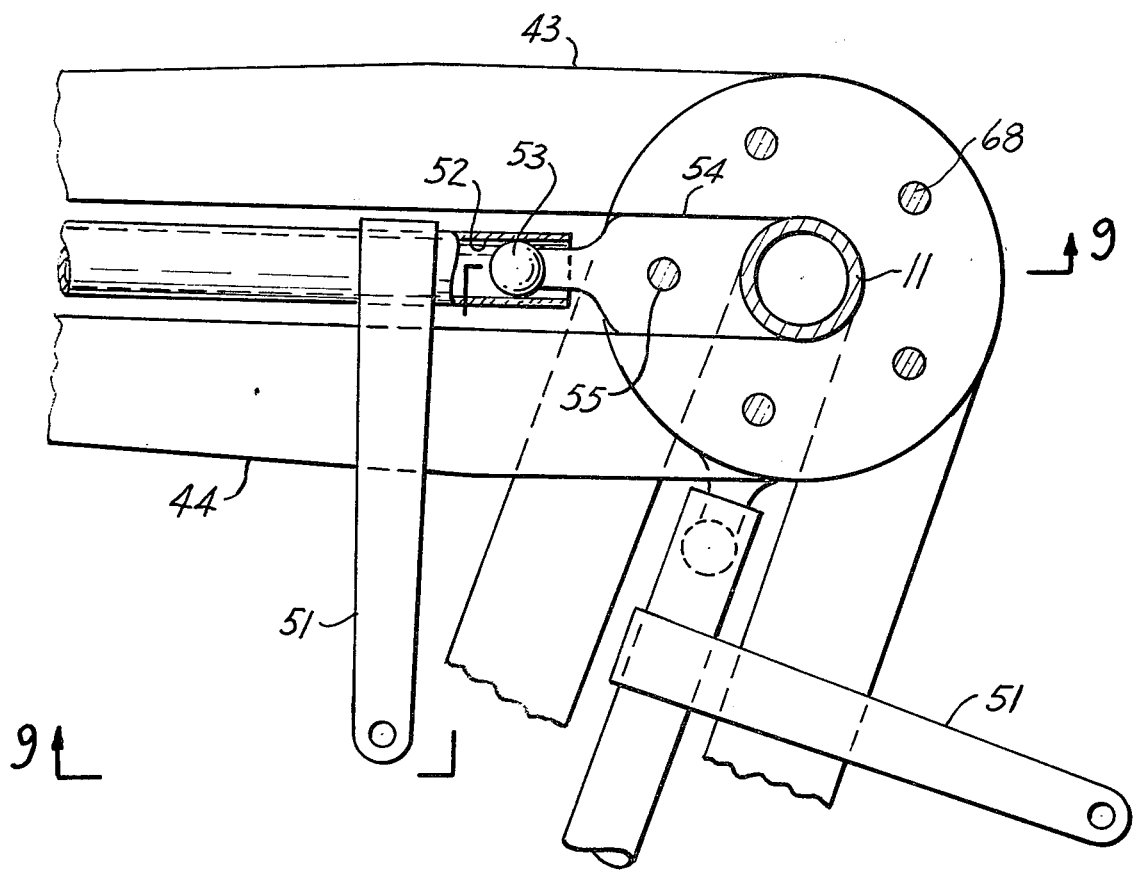
FIG. 8 is an enlarged view of a portion of FIG. 1, partially in cutaway cross-section.
Figure 9:
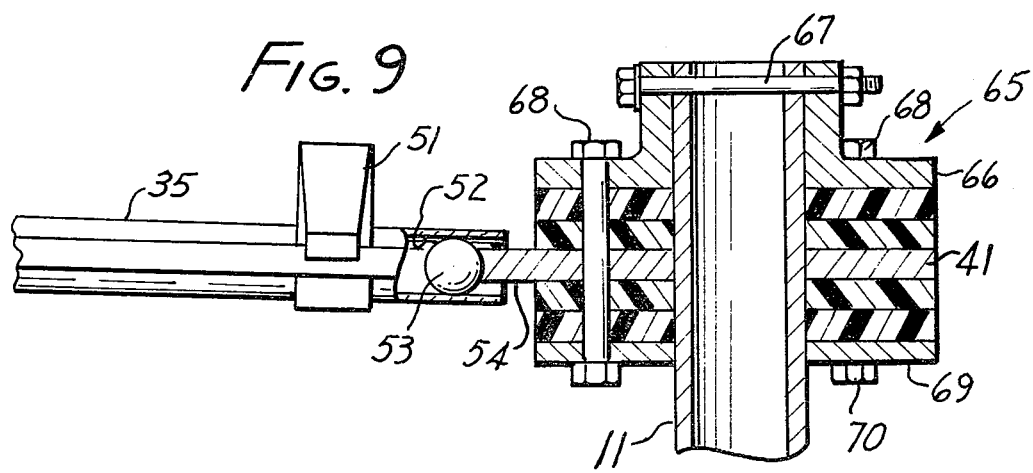
FIG. 9 is a view taken at line 9—9 in FIG. 8.

The bight portion includes a pair of arms 43, 44 which extend from the flat portion toward the airfoil portion, and are progressively shaped at first to provide a pair of channels 45, 46 on opposite sides of the torque tube (FIGS. 4 and 5). The channels are identical so that only channel 45 will be discussed in detail. It has a flat bottom member 47 and a pair of flanges 48, 49. The flanges are directed away from the torque tube, which passes between the channels. These channels progressively change their shape as shown in the drawings and finally merge to form a bundle 50, parts of which pass on each side of the flattened portion of the torque tube and then continue into the region to form the spar.

At least arms 43 and 44 are stiffly flexible as would be expected of a bundle of glass fibers bonded together. They have substantial tensile strength to resist centrifugal forces, and sufficient flexibility to accommodate feathering, lead/lag and flapping movements.

The torque tube extends inboard toward the mast and has a pitch horn 51 connected thereto. The torque tube of each of the blades will have its own respective pitch horn. The pitch horns are connected to a swash plate (not shown) to control the angle of attack of the blades. Turning the pitch horn will rotate the blade around its axis 31 for feathering motion.

A frist bearing member 52 is formed inside the torque tube at its inward end. The bearing member includes a cylindrical passage adapted to receive a second bearing member 53 in the shape of a ball which closely fits inside bearing member 52. Thus the torque tube can be rotated around its own axis, and can be angularly moved in any direction from its axis around the center of bearing member 53. It also has limited freedom for longitudinal movement, as limited by the bight portion and by arms 43 and 44. The bearing comprising members 52 and 53 is not intended to transfer any appreciable centrifugal load. The centrifugal load is transferred by flat portion 41 which constitutes a flexible continuation of the spar itself. Instead, the bearing acts to stabilize the inboard end of the blade at the torque tube. It enables the blade (and torque tube) to move angularly in any direction from axis 31 of the blade, around bearing member 53 as a center. This enables lead/lag and flapping movement.

Second bearing member 53 is mounted to a mounting plate 54 which fits between the two arms of the bight portion, and has a hole 55 to pass attachment means yet to be described.

As best shown in FIG. 2, a small angle (perhaps 2°) is formed in the arms in the bight portion to give a built-in coning angle to the structure. As illustrated, angle 60 is that small angle plus 90°.

Attachment means 65 is provided to mount the flat portions of the bight portions to the mast. The attachment means includes an upper base plate 66 which is attached near the top of the mast and is connected thereto by a cross bolt 67. It behaves as a flange on the mast. Five attachment bolts 68 extend downwardly through holes in the flat portions and in the upper plate, and through holes in a bottom end plate 69, below which nuts 70 are applied to compress the flat portions and the mounting plates in a stack and to hold them to the mast. Attachment means 65 comprises plates 66 and 69, and bolts 67 and 68. It will now be seen that upward forces exerted by the blades on the mast when the mast is turned will be exerted through the attachment means, and that centrifugal loads will be transmitted directly to the mast by the bights of the blades.

As to materials of construction, the skin section will usually be of a fiberglass or composite type construction. The fibers will usually be S-glass or some other form of glass fibers, with the correct cross-section area and in a sufficient number to provide the properties required for the blade. The bonding material is preferably an initially liquid curable resin. Preferably it is a vinyl ester resin rather than a thermal setting epoxy. When fiberglass is used, polyester resin can be used. While polyester resin will mix well, it has relatively poor strength. However, vinyl ester resin has the strength of epoxy and the workability of of polyester. A wet layup procedure can be utilized, which is very convenient. One can squeeze and pat out excess resins to room temperatures while shaping the material to the desired configuration. Instead, a "pre-preg" system can be used, which is well-known in the art. In all of the processes, the bonding material (the resin) fills out the structure to a smooth and continuous configuration by seepage and by abutment with a mold surface, or by mechanical smoothing.

The term "bonding material" is used for the resin, even though it provides much or most of the structure, and the materials in it act primarily as structure elements or reinforcement. However, it does adhere to the other materials and joins them to form unitary constructions. For this reason, the term "bonding" is used, although it is not intended to exclude the meaning of "structure". The bonding layers which join the sub-elements may be the same or a different material. Using the same bonding material has the advantage of avoiding points of discontinuity of structural properties. The techniques of constructing the various portions will be understood by persons skilled in the fiberglass and resin-epoxy arts and requires no further discussion here. However a more complete disclosure will be found in the aforesaid co-pending patent application.

In order to provide some streamlining for the system inboard of the airfoil portion, a shroud 75 is provided which preferably has a airfoil configuration. It covers most of the bight portion of the blades. It, and the skin in FIGS. 1 and 2, are shown in dashed lines in order to reduce the complexity of the drawings.

It will now be seen that the blades and the bight portions can readily be manufactured, uniformly and quickly, using conventional molds, fixtures, and techniques. After assembly and curing, they can simply be mounted to the mast by the attachment means, and the system is ready to operate.

The system flexes and twists in the arms near the mast. The blade bends to lead and lag primarily just outboard from the point of joinder of the torque tube to the counterweight rod. The bearing means is forgiving of movements in directions lateral to the blade axis (which constitute these motions). Rotating the pitch horn will rotate the blade to vary its angle of attack.

As many or as few blades as necessary will be provided, and will be joined in the stack at the mast. Only two are shown for purposes of simplicity of drawings, although in the illustrated example, three more will be provided.

It will thereby be seen that a simple, unitary rotor system is provided which can reliably and readily be manufactured utilizing simple metal forming techniques and fiberglass layup techniques, resulting in a relatively inexpensive blade of a very high quality. The construction provides for all necessary blade motions, without requiring conventional hubs, hinges and bearings.

The blade is in effect a single, monolithic structure wrapped directly around the main rotor shaft and driven directly by it, without interposition of conventional elements such as clevises and hinges.

This invention is not to be limited by the embodiment shown in the drawings and described in the description, which is given by way of example and not of limitation by only in accordance with the scope of the appended claims.

I claim:

1. A helicopter rotor system comprising:
   a rotary mast having an upright axis;
   a plurality of rotor blades mounted to said rotary mast to be turned by said mast, each said blade having a respective longitudinal axis directed away from said mast, all of said rotor blades being substantially identical to one another, and being angularly spaced apart around said mast, each said blade comprising a skin forming an airfoil and an internal region, a counterweight rod and a spar extending longitudinally inside said region, said spar comprising a bundle of aligned fibers which, inside said region are bonded to each other, to said skin, and to said counterweight rod, said bundle being doubled so as to form a U-shaped bight portion with a bend and a pair of arms disposed inboard of said skin, said fibers inside said region constituting continuations of the fibers in said arms;
   a longitudinally-extending torque tube rigidly attached to said counterweight rod at a first end of said torque tube, and a first bearing member adjacent to the other end of said torque tube, said torque tube having an axis;
   a second bearing member mounted to said mast and engaged to said first bearing member, whereby said torque tube is rotatable around its own axis, and can move in any angular direction away from said longitudinal axis around the center of said second bearing means, whereby to enable lead/lag and flapping movements;
   the bight portion being progressively shaped from a flat portion bent directly around said mast, through a pair of separate channel sections, to a bundle adjacent to said counterweight rod;
   pitch horn means attached to said torque tube to rotate said torque around the axis of said torque tube;
   attachment means attaching said flat portions of said bight portion in a stack to transfer centrifugal loads to said mast; and
   said bight portion being bendable adjacent to said mast.

2. A system according to claim 1 in which said second bearing member is formed on a mounting plate of substantially the same thickness as said flat portion, and fits between the arms of the bight in said stack, adjacent to said mast.

3. A system according to claim 1 in which said attachment means comprises a base plate fixed to said mast as a flange, an end plate, said stack being placed between said plates, spindled on said mast, and a plurality of fasteners passing through said stack and said plates, drawing said plates toward one another to compress and to hold said stack to said base plate.

4. A system according to claim 1 in which said tube is flattened at its location of attachment to said counterweight rod.

5. A system according to claim 1 in which a spacer is placed in said region to support sides of said airfoil.

6. A system according to claim 1 in which a shroud surrounds said arms of said bight portion between said skin and a location near said pitch horn, said shroud not attached to arms of said bight portion, which therefore allows lead/lag movement during operation.

7. A system according to claim 6 in which said shroud has a streamlined outer contour.

8. A system according to claim 7 in which chafing members are placed between said U-shaped portions and said shroud.

9. A system according to claim 1 in which said fibers are glass, inherently flexible, and are bonded together by an organic plastic material which renders the spar stiffly flexible and shape-retaining, said arms being formed with an upwardly directed bend to provide a coning angle.

10. A system according to claim 1 in which said bight portion and said torque tube are not bonded together at the channel sections, but instead flex at that location independently of one another.

* * * * *